A. B. Lawther.
Turning and Milling.
N° 42,201. Patented Apr. 5, 1864.
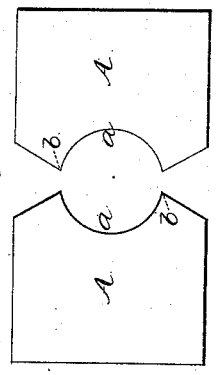
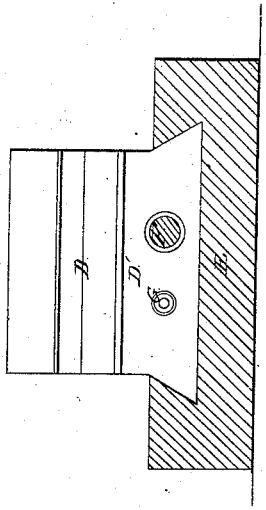
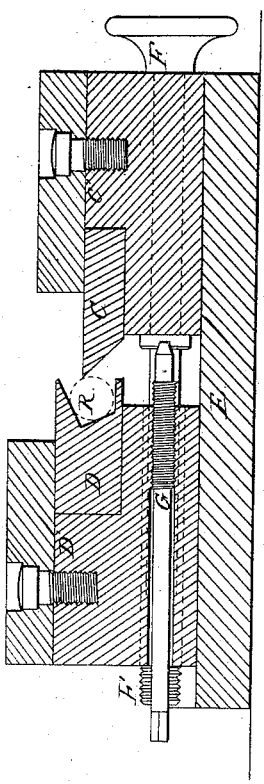
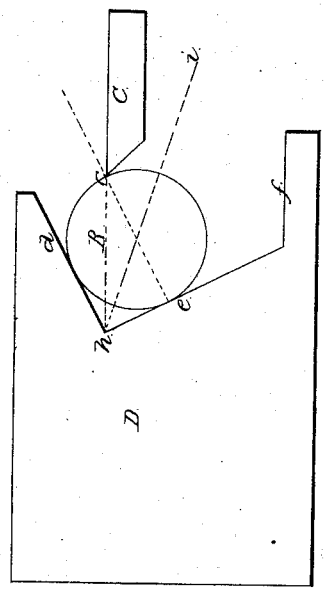

UNITED STATES PATENT OFFICE.

A. B. LAWTHER, OF STONINGTON, CONNECTICUT.

IMPROVEMENT IN CLAMP MILLING-MACHINES.

Specification forming part of Letters Patent No. 42,201, dated April 5, 1864.

*To all whom it may concern:*

Be it known that I, A. B. LAWTHER, of Stonington, in the county of New London and State of Connecticut, have invented a new and useful Improvement in Clamp Milling-Machines; and I do hereby declare that the following is a full, clear, and exact description of the same, reference being had to the accompanying drawings, forming part of this specification, in which—

Figure 1 is a transverse vertical section of a machine with my improvement. Fig. 2 is a face view of the rest. Fig. 3 is a profile diagram of the rest and cutter, illustrating the action of the improvement. Fig. 4 is a profile diagram of the cutters commonly used.

Similar letters of reference indicate corresponding parts in the several figures.

The clamp milling-machine to which my invention relates is commonly used for sizing such articles as gun screws and barrels, center-pins for pistols, ramrod-heads, &c., and other round work which requires to be duplicated and which does not specially require to be turned in lathe-centers.

The object of my improvement is to allow the same tools to be used for cutting various sizes and to prevent the work from rolling out when being operated upon; and to this end it consists principally in the combination of a single cutting-edge and an opposite rest to confine the work to said edge.

To enable the nature of my invention to be more fully understood, I will, before explaining it, describe briefly the kind of tools commonly used, the transverse profile of which is represented in Fig. 4. These tools A A, two in number, are both alike, having each a cavity, $a$, of nearly semicircular form, to serve as a rest or support for the article to be milled to revolve in a cutting-edge, $b$. By these tools only one size can be cut, and by grinding the edges the rest will be so far reduced from its proper depth as to permit the work to roll out while being operated upon. My invention differs from this only in the form of the tools, the same number being used, but one, C, Figs. 1 and 3, having a cutting-edge, $c$, and the other, D, Figs. 1, 2, and 3, serving as the rest. The rest is made with a cavity, $d\,e\,f$, which presents three plane surfaces, as shown in Fig. 3, the surfaces $d$ and $e$ being at right angles to each other, and the surface $d$ being at an angle of about twenty-six degrees to the plane of motion of the cutting-edge $c$ in the adjustment of the tool C, which is represented by the line $h\,c$. The work B is placed in the angle $d\,h\,e$ of the rest, and the cutting-edge $c$ comes in contact with it at a point formed by drawing the diameter of B at a right angle to the surface $e$. As the work B is reduced in size, it moves back into the cavity of the rest in the dotted line $i\,h$, the cutting-edge $c$ following in the dotted line $h\,c$, and always maintaining the same relative position diametrically opposite the point of contact of B with the surface $e$. This insures the work being perfectly round, while the surface $d$ prevents the work from rolling onto the tool C. The surface $f$, which is parallel, or nearly so, with the line of motion of the cutter, is only to bring the work into contact with the cutter at first. After the cutter takes hold, the "chip" will keep the work in contact with the surface $d$, and the work must not touch $f$ afterward, or it will not be cut to a true circle.

The diagram, Fig. 3, represents what will always be a transverse section or profile of a rest and cutter for work having any form of longitudinal profile, but the longitudinal profile of the rest and cutting-edge may be straight, or vary according to the desired longitudinal profile of the work. Straight work will be produced by a straight rest and straight cutting-edge, and taper work may be produced by the same rest and cutter by simply setting one edge of the cutter in advance of the other; but for irregular work the longitudinal profile of the rest and cutting-edge must conform to the desired profile of the work. For work with square shoulders—as a gun-screw—the cutter can be made in two or more pieces, while the rest may be straight and only bear upon the body of the screw.

E, Figs. 1 and 2, is the bed-plate of the machine. D' and C' are the tool-holders, having the tools D and C secured in them in the usual manner. F is a screw for moving the cutter up to its work, and G is a stop screw adjusted to stop the cutter-holder D' when the work has been reduced to the required size.

What I claim as my invention, and desire to secure by Letters Patent, is—

1. The combination of the cutter C and rest

D, constructed, arranged, and operating substantially as and for the purpose set forth.

2. The rest D, having its surfaces $d\ e$ arranged substantially as herein described in relation to each other and to the line of motion of the cutter, substantially as herein specified.

3. The surface $f$ of the rest, arranged relatively to the cutter, substantially as and for the purpose herein specified.

<div style="text-align: right;">A. B. LAWTHER.</div>

Witnesses:
   WINTHROP WARD,
   A. L. SUESMAN.